(12) United States Patent
Yang et al.

(10) Patent No.: US 9,257,841 B2
(45) Date of Patent: Feb. 9, 2016

(54) USB CONNECTOR, PCB CONNECTED THERETO, AND USB DEVICE

(71) Applicant: Huawei Device Co., Ltd., Shenzhen (CN)

(72) Inventors: Zhaoliang Yang, Shenzhen (CN); Huiliang Xu, Shenzhen (CN); Sheng Zhu, Shenzhen (CN); Guangsheng Pan, Shenzhen (CN); Dongxing Tu, Shenzhen (CN); Dingjie Wang, Shenzhen (CN)

(73) Assignee: Huawei Device, Co., Ltd., Shenzhen (CN)

( * ) Notice: Subject to any disclaimer, the term of this patent is extended or adjusted under 35 U.S.C. 154(b) by 470 days.

(21) Appl. No.: 13/779,620

(22) Filed: Feb. 27, 2013

(65) Prior Publication Data

US 2013/0169063 A1 Jul. 4, 2013

Related U.S. Application Data

(63) Continuation of application No. PCT/CN2011/083442, filed on Dec. 5, 2011.

(30) Foreign Application Priority Data

Dec. 3, 2010 (CN) .......................... 2010 1 0590731

(51) Int. Cl.
*H02J 3/01* (2006.01)
*H01R 13/6594* (2011.01)
(Continued)

(52) U.S. Cl.
CPC . *H02J 3/01* (2013.01); *H01R 13/02* (2013.01); *H01R 13/6594* (2013.01); *H01R 13/719* (2013.01)

(58) Field of Classification Search
USPC ......................................................... 307/147
See application file for complete search history.

(56) References Cited

U.S. PATENT DOCUMENTS 6,234,827 B1   5/2001 Nishio et al.
6,948,983 B1 *  9/2005 Peng ............................ 439/660
(Continued)

FOREIGN PATENT DOCUMENTS

CN      1531222 A     9/2004
CN      2662334 Y    12/2004
(Continued)

OTHER PUBLICATIONS

Foreign Communication From A Counterpart Application, European Application No. 11845035.2, Extended European Search Report dated Aug. 21, 2013, 7 pages.
(Continued)

*Primary Examiner* — Robert DeBeradinis
(74) *Attorney, Agent, or Firm* — Conley Rose, P.C.; Grant Rodolph; Nicholas K. Beaulieu

(57) ABSTRACT

A USB connector, a PCB connected to the USB connector, and a USB device are provided. The USB connector includes a metal surface, and on the metal surface, a solid metal part is set at a location corresponding to a spring of a socket, so that the spring contacts the solid metal part after the USB connector is inserted into the socket to reduce electromagnetic interference. The USB connector may include an in-line weld leg; a metal enclosure located at the same side as the in-line weld leg fully contacts a PCB when the USB connector is connected to the PCB; and contact surfaces on the USB connector that contact the PCB are metal surfaces. The PCB includes a suppression circuit configured to suppress harmonic waves in USB data transmission.

15 Claims, 4 Drawing Sheets

(51) Int. Cl.
*H01R 13/719* (2011.01)
*H01R 13/02* (2006.01)
*H01B 7/30* (2006.01)

(56) References Cited

U.S. PATENT DOCUMENTS

| | | |
|---|---|---|
| 2004/0179491 A1 | 9/2004 | Hosomi |
| 2006/0134962 A1 | 6/2006 | Yeh |
| 2007/0082554 A1 | 4/2007 | Saito |
| 2008/0246576 A1* | 10/2008 | Terlizzi .................. 336/175 |
| 2010/0123006 A1 | 5/2010 | Chen |
| 2010/0124847 A1* | 5/2010 | Shiu et al. ............... 439/607.35 |
| 2010/0248515 A1 | 9/2010 | Kondo et al. |
| 2013/0045629 A1 | 2/2013 | Zhu et al. |

FOREIGN PATENT DOCUMENTS

| | | |
|---|---|---|
| CN | 1722541 A | 1/2006 |
| CN | 201289647 Y | 8/2009 |
| CN | 201608292 U | 10/2010 |
| CN | 201629421 U | 11/2010 |
| CN | 102176576 A | 9/2011 |
| JP | 097699 A | 1/1997 |
| JP | 1186980 A | 3/1999 |
| JP | 2000223218 A | 8/2000 |
| JP | 2007103249 A | 4/2007 |
| JP | 2010225426 A | 10/2010 |

OTHER PUBLICATIONS

Foreign Communication From A Counterpart Application, PCT Application No. PCT/CN2011/083442, English Translation of Written Opinion dated Mar. 15, 2012, 4 pages.
Foreign Communication From A Counterpart Application, Japanese Application No. 2013-527465, Japanese Office Action dated Mar. 18, 2014, 3 pages.
Foreign Communication From A Counterpart Application, Japanese Application No. 2013-527465, English Translation of Japanese Office Action dated Mar. 18, 2014, 4 pages.
Communication from a foreign counterpart application, International Application No. PCT/CN2011/083442, English Translation, International Search Report dated Mar. 15, 2012, 4 pages.
Foreign Communication From A Counterpart Application, Chinese Application 201010590731.8, Chinese Office Action dated Aug. 3, 2012, 6 pages.
Foreign Communication From A Counterpart Application, Chinese Application 201010590731.8, Partial Translation of Chinese Office Action dated Aug. 3, 2012, 3 pages.

* cited by examiner

USB CONNECTOR, PCB CONNECTED THERETO, AND USB DEVICE

CROSS-REFERENCE TO RELATED APPLICATIONS

This application is a continuation of International Application No. PCT/CN2011/083442, filed on Dec. 5, 2011, which claims priority to Chinese Patent Application No. 201010590731.8, filed on Dec. 3, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to terminal technologies, and in particular, to a USB connector, a PCB connected to the USB connector, and a USB device.

BACKGROUND

After several years of development, wireless terminal products are diversified, including handsets, data cards, handheld smart phones, and the like. These products have a common form, that is, an interface is generally reserved for communication with a computer. The most extensively used interface is a universal serial bus (USB) interface. A data card, in particular, is mainly powered by a computer and exchanges data with the computer. The power supply and data interaction of the data card are implemented by using a USB interface.

FIG. 1 is a schematic structural diagram of a USB connector in the prior art. As shown in FIG. 1, the upper surface and lower surface of the USB connector have two through-holes 11 respectively. The locations of these four through-holes 11 correspond to four springs on a socket. When the USB connector is connected to the socket, the four springs on the upper surface and lower surface of the socket are exactly inserted into the four holes of the connector, so that the connector and the socket are not fully connected. When the USB connector is normally inserted, it can be guaranteed that only two springs at the sides of the connector and the socket are contacted. These two contacts easily cause port disconnection in the case of high-speed data transmission. In addition, because the contacts are insufficient, contact impedance is generated, and rich interference signals are generated in the high-speed transmission of digital signals, which affects normal communication.

In addition, when the USB connector is connected to a printed circuit board (PCB), the USB connector is inserted into a socket on the PCB through an in-line weld leg 12 on the USB connector. As shown in FIG. 1, a recess 13 exists between the side enclosure of the USB connector and the in-line weld leg. Due to the existence of the recess 13, the USB connector cannot fully contact the PCB. In addition, surfaces on the USB connector that contact the PCB, as shown by a contact surface and a contact surface in FIG. 1, are made of plastics, so that the USB connector cannot contact the PCB properly.

Due to the foregoing design of the USB connector in the prior art, the USB connector cannot fully contact the socket and/or the PCB, and will generate contact impedance and generate interference in the case of high-speed transmission of digital signals, thus affecting the normal operation of the system.

SUMMARY

Embodiments of the present invention provide a USB connector, a PCB connected to the USB connector, and a USB device to reduce interference in USB data transmission and increase system performance.

In one aspect, an embodiment of the present invention provides a USB connector, including a metal surface, where: on the metal surface, a solid metal part is set at a location corresponding to a spring of a socket, so that the spring contacts the solid metal part after the USB connector is inserted into the socket.

In another aspect, an embodiment of the present invention provides a USB connector, including an in-line weld leg, where the USB connector meets at least one of the following conditions: a metal enclosure located at the same side as the in-line weld leg on the USB connector fully contacts a PCB when the USB connector is connected to the PCB; and a surface, on the USB connector, that contacts the PCB is a metal surface.

In still another aspect, an embodiment of the present invention provides a PCB configured to connect to a USB connector, including: a suppression circuit configured to suppress harmonic waves in USB data transmission.

An embodiment of the present invention provides a USB device, including the foregoing USB connector and/or PCB.

According to the above technical solutions, the USB connector and the PCB connected to the USB connector, and the USB device in embodiments of the present invention use a solid metal part on a metal surface to replace a through-hole, thereby ensuring full connection between the USB connector and the socket and reducing interference; extend the recess part of a metal enclosure located at the same side as the in-line weld leg, so that the metal enclosure located at the same side as the in-line weld leg on the USB connector fully contacts the PCB when the USB connector is connected to the PCB, thereby increasing the adequacy of the contact between the USB connector and the PCB and reducing interference; and use a metal surface as the surface of the USB connector that contacts the PCB, thereby increasing adequacy and reducing interference; and arrange a suppression circuit in the PCB, thereby suppressing interference.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 2:
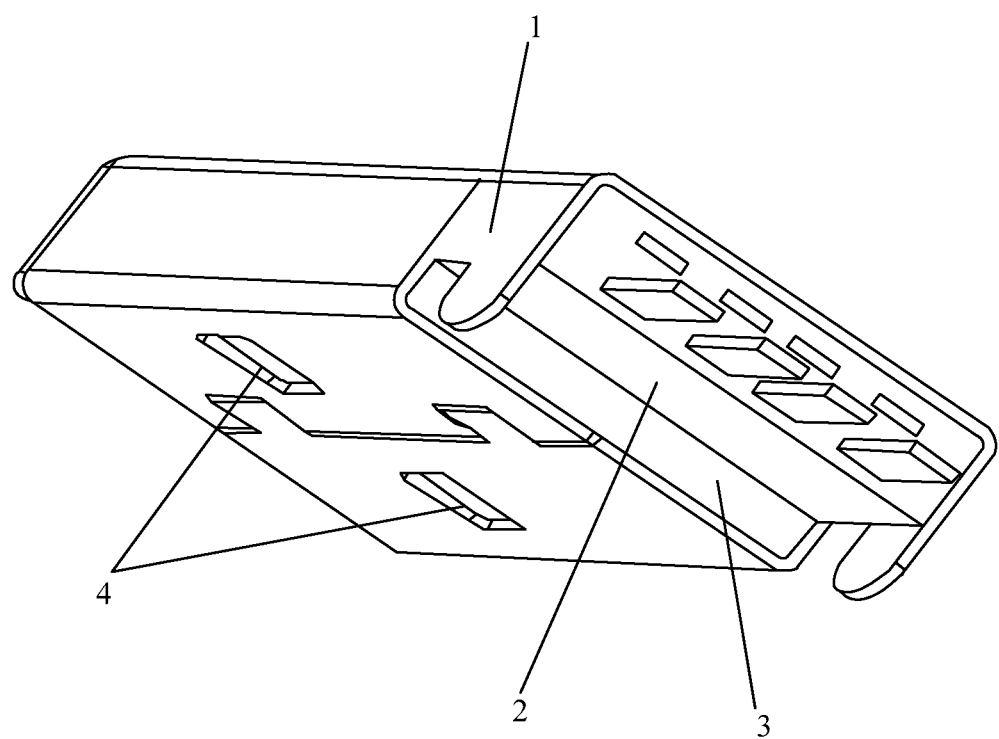
FIG. 2 is a schematic structural diagram of a USB connector according to a first embodiment of the present invention.
Figure 3:
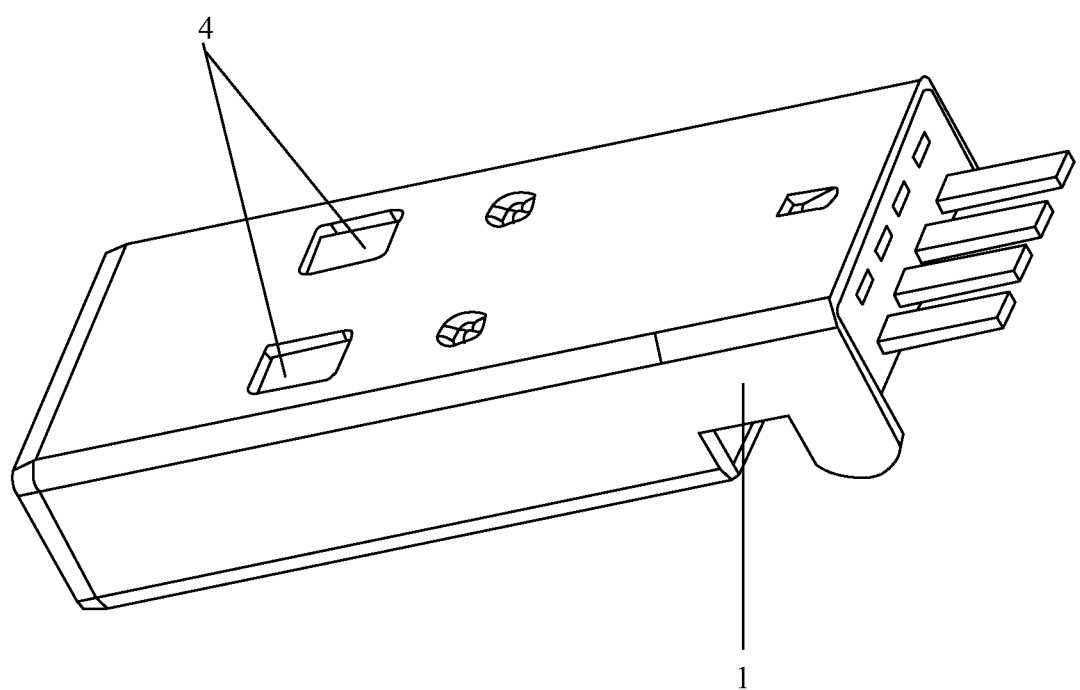
FIG. 3 is a schematic structural diagram of a USB connector according to a second embodiment of the present invention.

FIG. 2 is a schematic structural diagram of a USB connector according to a first embodiment of the present invention. FIG. 3 is a schematic structural diagram of a USB connector according to a second embodiment of the present invention. The visual angles illustrated in FIG. 2 and FIG. 3 are different.

As shown in FIG. 2 or FIG. 3, to increase the adequacy of the contact between a USB connector and a socket, embodiments of the present invention provide the following technical solution:

The USB connector includes a metal surface, and on the metal surface, a solid metal part 4 is set at a location corresponding to a spring of the socket, so that the spring contacts the solid metal part 4 after the USB connector is inserted into the socket.

Further, to avoid excessive distortion of the spring on the socket, the solid metal part 4 may be set to be a metal recess part.

Figure 1:
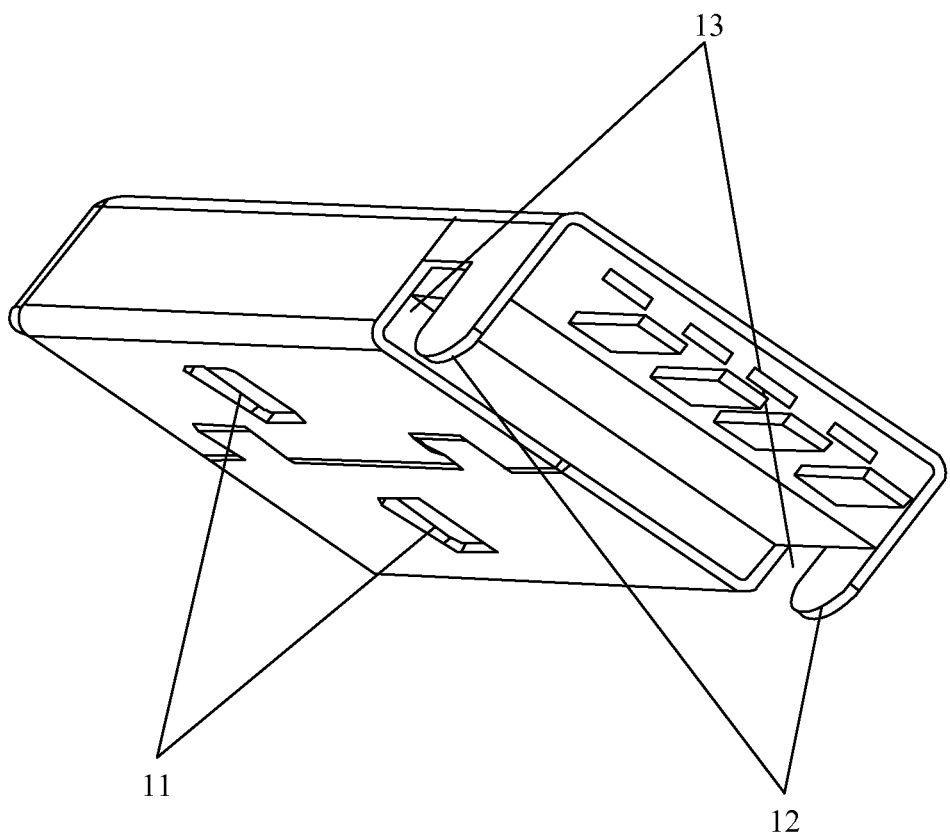
FIG. 1 is a schematic structural diagram of a USB connector in the prior art.

As shown in FIG. 1, a through-hole 11 is set at a location corresponding to a spring of the socket in the prior art, but the through-hole cannot ensure that the USB connector fully contacts the socket. To increase the contact between the USB connector and the socket, in the embodiments, the original through-hole is blocked with a metal. That is, as shown in FIG. 2 or FIG. 3, in the embodiments, a metal part 4 is set at the location of the original through-hole, so that the USB connector contacts the socket properly. To avoid excessive distortion of the spring and prolong the service life of the socket, in the embodiments, the metal part 4 may be set to make it be shorter than surrounding metals, that is, the metal part is set to be in a recess shape.

In the embodiments, the original through-hole part is set to be a metal part, so that the USB connector fully contacts the socket, thereby avoiding interference due to poor contact.

As shown in FIG. 2 or FIG. 3, to increase the contact between the USB connector and the socket, the embodiments of the present invention provide the following technical solution:

The USB connector meets at least one of the following conditions: A metal enclosure located at the same side as the in-line weld leg fully contacts a PCB when the USB connector is connected to the PCB; and the surface, on the USB connector, that contacts the PCB is a metal surface.

Specifically, as shown in FIG. 1, on the USB connector in the prior art, a recess 13 exists on the metal enclosure located at the same aside as the in-line weld leg. Due to the existence of the recess, the USB connector cannot be fully connected to the PCB. In the embodiments, to enable the USB connector to fully contact the PCB, the metal at the location of the original recess 13 is extended, so that the metal enclosure fully contacts the PCB when the USB connector is connected to the PCB. That is, as shown in FIG. 2 or FIG. 3, in the embodiments, the original recess part is extended, so that the height of the metal enclosure 1 of the original recess part fully contacts the PCB when the USB connector is connected to the PCB. For example, as shown in FIG. 1, the height of the original recess part 13 is smaller than the height of the plastics inside the recess part 13. However, in the embodiments of the present invention, as shown in FIG. 2 or FIG. 3, the recess part 1 is extended, and the height of the recess part 1 is equal to the height of the plastics inside the recess part 13. In this way, the recess part can fully contact the PCB when the USB connector is connected to the PCB.

In addition, in the embodiments, an original contact surface is set to be a metal surface, that is, as shown in FIG. 2, a contact surface 2 and a contact surface 3 on the USB connector that contact the PCB are set to be metal surfaces.

In the embodiments, the original recess part is extended and/or the contact surfaces are set to be metal surfaces, so that the USB connector can fully contact the PCB, thereby avoiding interference due to poor contact.

Described above are scenarios where the USB connector is connected to the socket and the USB connector is connected to the PCB. It is understandable that an improvement on the USB connector may be made by combining the foregoing two scenarios.

The foregoing design may improve the contact between the USB connector and the socket or between the USB connector and the PCB. To further improve interference, a suppression circuit may be set in the PCB.

Figure 4:
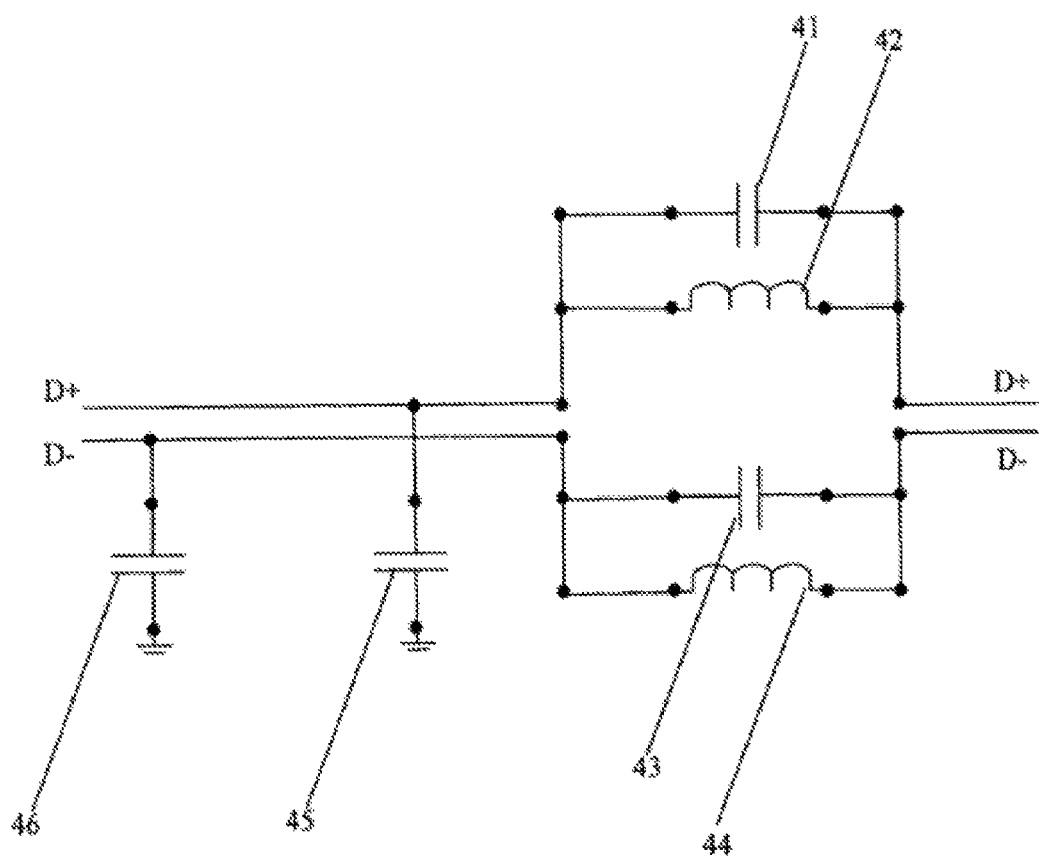
FIG. 4 is a schematic structural diagram of a PCB according to a third embodiment of the present invention.

FIG. 4 is a schematic structural diagram of a PCB according to a third embodiment of the present invention. As shown in FIG. 4, the PCB in this embodiment includes a suppression circuit configured to suppress harmonic waves in USB data transmission.

As shown in FIG. 4, voltages that the USB connector inputs to the PCB include D+ and D− (as shown at the left side in FIG. 4). In the prior art, the D+ and D− are directly provided to components on the PCB (as shown at the right side in FIG. 4). In this embodiment, to suppress interference, a suppression circuit including a capacitor and an inductor that are shown in FIG. 4 are added.

In this embodiment, the suppression circuit may suppress 960 megahertz (MHz) harmonic waves in USB 2.0 data transmission, and reduce radiations of USB interference signals.

Specifically, as shown in FIG. 4, the suppression circuit in this embodiment includes: a first capacitor 41 and a first inductor 42 that are connected to a voltage line corresponding to a first voltage (D+) input by the USB connector, where the first capacitor 41 and the first inductor 42 are in parallel connection; and a second capacitor 43 and a second inductor 44 that are connected to a voltage line corresponding to a second voltage (D−) input by the USB connector, where the second capacitor 43 and the second inductor 44 are in parallel connection. One end of the first capacitor 41 and one end of the first inductor 42 in parallel connection are connected to a third capacitor 45; one end of the third capacitor 45 is connected to the voltage line corresponding to the first voltage and the other end is grounded; the other end of the first capacitor 41 and the other end of the first inductor 42 in parallel connection are used as an input end of the first voltage needed by components on the PCB. One end of the second capacitor 43 and one end of the second inductor 44 in parallel connection are connected to a fourth capacitor 46; one end of the fourth capacitor 46 is connected to the voltage line corresponding to the second voltage and the other end is grounded;

the other end of the second capacitor 43 and the other end of the second inductor 44 in parallel connection are used as an input end of the second voltage needed by components on the PCB.

In this embodiment, a suppression circuit is set, so that wave trapping can be performed on interference signals to filter interference signals, thereby increasing the reliability of the system.

It is understandable that the foregoing USB connector may be welded on a PCB to obtain a USB device. The USB connector may be the USB connector illustrated in FIG. 2 or FIG. 3, and the PCB may be the PCB illustrated in FIG. 4. The USB device may be a data card, a USB disk, and the like.

It should be understood that, related features in the method and device may be referenced mutually. In addition, "first" and "second" in the preceding embodiments are configured to distinguish embodiments, but do not represent superiority or inferiority of all embodiments.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof, without departing from the spirit and scope of the technical solution of the embodiments of the present invention.

What is claimed is:

1. A Universal Serial Bus (USB) connector comprising:
a metal surface,
wherein a solid metal part on the metal surface is set at a location corresponding to a spring of a socket such that the spring contacts the solid metal part after the USB connector is inserted into the socket,
wherein the USB connector is welded onto a printed circuit board (PCB) of a USB device,
wherein the PCB comprises a suppression circuit configured to suppress harmonic waves in USB data transmission, and
wherein the suppression circuit comprises:
a first capacitor and a first inductor connected to a voltage line corresponding to a first voltage input by the USB connector, wherein the first capacitor and the first inductor are in parallel connection; and
a second capacitor and a second inductor connected to a voltage line corresponding to a second voltage input by the USB connector, wherein the second capacitor and the second inductor are in parallel connection.

2. The USB connector according to claim 1, wherein the solid metal part comprises a recessed metal part.

3. The USB connector according to claim 1, wherein the USB device is a data card.

4. The USB connector according to claim 1, wherein the USB device is a USB disk.

5. The USB connector according to claim 1, wherein one end of the first capacitor and one end of the first inductor in parallel connection are connected to a third capacitor, wherein one end of the third capacitor is connected to the voltage line corresponding to the first voltage and the other end is grounded, wherein the other end of the first capacitor and the other end of the first inductor in parallel connection are used as an input end of the first voltage needed by components on the PCB, and wherein one end of the second capacitor and one end of the second inductor in parallel connection are connected to a fourth capacitor, wherein one end of the fourth capacitor is connected to the voltage line corresponding to the second voltage and the other end is grounded, and wherein the other end of the second capacitor and the other end of the second inductor in parallel connection are used as an input end of the second voltage needed by components on the PCB.

6. A Universal Serial Bus (USB) connector comprising:
an in-line weld leg, and
wherein a metal enclosure located at a same side of the USB connector as the in-line weld leg fully contacts a printed circuit board (PCB) when the USB connector is connected to the PCB, or
wherein a surface on the USB connector that contacts the PCB comprises a metal surface,
wherein the PCB comprises a suppression circuit configured to suppress harmonic waves in USB data transmission, and
wherein the suppression circuit comprises:
a first capacitor and a first inductor connected to a voltage line corresponding to a first voltage input by the USB connector, wherein the first capacitor and the first inductor are in parallel connection; and
a second capacitor and a second inductor connected to a voltage line corresponding to a second voltage input by the USB connector, wherein the second capacitor and the second inductor are in parallel connection.

7. The USB connector according to claim 6, wherein the USB connector comprises the metal surface, and wherein a solid metal part on the metal surface is set at a location corresponding to a spring of a socket such that the spring contacts the solid metal part after the USB connector is inserted into the socket.

8. The USB connector according to claim 7, wherein the solid metal part comprises a recessed metal part.

9. The USB connector according to claim 6, wherein one end of the first capacitor and one end of the first inductor in parallel connection are connected to a third capacitor, wherein one end of the third capacitor is connected to the voltage line corresponding to the first voltage and the other end is grounded, wherein the other end of the first capacitor and the other end of the first inductor in parallel connection are used as an input end of the first voltage needed by components on the PCB, and wherein one end of the second capacitor and one end of the second inductor in parallel connection are connected to a fourth capacitor, wherein one end of the fourth capacitor is connected to the voltage line corresponding to the second voltage and the other end is grounded, and wherein the other end of the second capacitor and the other end of the second inductor in parallel connection are used as an input end of the second voltage needed by components on the PCB.

10. A printed circuit board (PCB) connected to a Universal Serial Bus (USB) connector comprising:
a suppression circuit configured to suppress harmonic waves in USB data transmission,
wherein the suppression circuit comprises:
a first capacitor and a first inductor connected to a voltage line corresponding to a first voltage input by the USB connector, wherein the first capacitor and the first inductor are in parallel connection; and
a second capacitor and a second inductor connected to a voltage line corresponding to a second voltage input by the USB connector, wherein the second capacitor and the second inductor are in parallel connection.

11. The PCB according to claim 10, wherein one end of the first capacitor and one end of the first inductor in parallel connection are connected to a third capacitor, wherein one end of the third capacitor is connected to the voltage line corresponding to the first voltage and the other end is grounded, wherein the other end of the first capacitor and the other end of the first inductor in parallel connection are used as an input end of the first voltage needed by components on the PCB, and wherein one end of the second capacitor and one end of the second inductor in parallel connection are connected to a fourth capacitor, wherein one end of the fourth capacitor is connected to the voltage line corresponding to the second voltage and the other end is grounded, and wherein the other end of the second capacitor and the other end of the second inductor in parallel connection are used as an input end of the second voltage needed by components on the PCB.

12. The PCB according to claim 10, wherein the USB connector comprises a metal surface, and wherein a solid metal part on the metal surface of the USB connector is set at a location corresponding to a spring of a socket such that the spring contacts the solid metal part after the USB connector is inserted into the socket.

13. The PCB according to claim 10, wherein the PCB comprises a component of a USB device, and wherein the USB connector is welded onto the PCB of the USB device.

14. The PCB according to claim 13, wherein the USB device is a data card.

15. The PCB according to claim 13, wherein the USB device is a USB disk.

* * * * *

UNITED STATES PATENT AND TRADEMARK OFFICE
CERTIFICATE OF CORRECTION

PATENT NO. : 9,257,841 B2
APPLICATION NO. : 13/779620
DATED : February 9, 2016
INVENTOR(S) : Zhaoliang Yang et al.

Page 1 of 1

It is certified that error appears in the above-identified patent and that said Letters Patent is hereby corrected as shown below:

On the title page, item (30), Foreign Application Priority Data section should read:

Dec. 3, 2010     (CN) ............................. 201010590731.8

Signed and Sealed this
Twenty-third Day of August, 2016

Michelle K. Lee
*Director of the United States Patent and Trademark Office*